US011216592B2

(12) United States Patent
Avanzi et al.

(10) Patent No.: US 11,216,592 B2
(45) Date of Patent: Jan. 4, 2022

(54) DYNAMIC CRYPTOGRAPHIC KEY EXPANSION

(71) Applicant: QUALCOMM Incorporated, San Diego, CA (US)

(72) Inventors: Roberto Avanzi, Munich (DE); Darren Lasko, Forest, VA (US)

(73) Assignee: Qualcomm Incorporated

( * ) Notice: Subject to any disclaimer, the term of this patent is extended or adjusted under 35 U.S.C. 154(b) by 307 days.

(21) Appl. No.: 16/053,626

(22) Filed: Aug. 2, 2018

(65) Prior Publication Data

US 2020/0042746 A1 Feb. 6, 2020

(51) Int. Cl.

| G06F 21/00 | (2013.01) |
| H04L 29/06 | (2006.01) |
| G06F 21/72 | (2013.01) |
| G06F 12/14 | (2006.01) |
| H04L 9/06 | (2006.01) |
| H04L 9/08 | (2006.01) |

(52) U.S. Cl.
CPC .......... *G06F 21/72* (2013.01); *G06F 12/1408* (2013.01); *H04L 9/0618* (2013.01); *H04L 9/0816* (2013.01); *H04L 2209/125* (2013.01)

(58) Field of Classification Search
CPC ... G06F 21/72; G06F 12/1408; H04L 9/0618; H04L 9/0816
See application file for complete search history.

(56) References Cited

U.S. PATENT DOCUMENTS

| 7,082,539 B1* | 7/2006 | Kitahara | G06F 21/71 |
| | | | 713/189 |
| 8,494,168 B1 | 7/2013 | Tolfmans | |
| 2007/0092081 A1* | 4/2007 | Yokota | G11B 20/00086 |
| | | | 380/277 |
| 2008/0183999 A1* | 7/2008 | Balinsky | G06F 21/77 |
| | | | 711/163 |

(Continued)

FOREIGN PATENT DOCUMENTS

WO 2011149986 A1 12/2011

OTHER PUBLICATIONS

International Search Report and Written Opinion—PCT/US2019/040720—ISA/EPO—dated Sep. 27, 2019.

*Primary Examiner* — Jeffrey C Pwu
*Assistant Examiner* — Rodman Alexander Mahmoudi
(74) *Attorney, Agent, or Firm* — Edward J. Meisarosh

(57) ABSTRACT

Some embodiments include systems and methods for the management of a plurality of expanded cryptographic keys associated with a plurality of corresponding Protected Software Environments (PSEs) supervised by PSE-management software running on a computer system. In one embodiment, a computer system has a first processor, a first memory controller, and a first RAM. The first memory controller has a first memory cryptography circuit connected between the first processor and the first RAM. The memory cryptography circuit comprises a keystore and a first cryptographic engine. The keystore comprises a seedstore and a key-expansion engine. The seedstore is configured to store a first plurality of cryptographic key seeds accessible by a key identifier, for use by the key-expansion engine to generate expanded keys, where each key seed corresponds to a corresponding client.

15 Claims, 7 Drawing Sheets

(56) References Cited

U.S. PATENT DOCUMENTS

| | | | |
|---|---|---|---|
| 2012/0079202 A1* | 3/2012 | Chirca | G06F 12/0862 |
| | | | 711/122 |
| 2016/0203342 A1* | 7/2016 | Matsuo | G06F 21/79 |
| | | | 713/193 |
| 2017/0139842 A1* | 5/2017 | Moriguchi | G06F 12/0802 |
| 2017/0270051 A1* | 9/2017 | Chen | G06F 12/1027 |
| 2019/0018961 A1* | 1/2019 | Kostyushko | G06F 7/582 |

* cited by examiner

DYNAMIC CRYPTOGRAPHIC KEY EXPANSION

BACKGROUND

Embodiments of the present disclosure relate generally to integrated circuits (ICs) and more particularly, but not exclusively, to IC-implemented cryptographic systems.

Cryptography is used to keep a user's private data secure from unauthorized viewers by, for example, encrypting the user's data intended to be kept private, known as plaintext, into ciphertext that is incomprehensible to unauthorized viewers. The encoded ciphertext, which appears as gibberish, may then be securely stored and/or transmitted. Subsequently, when needed, the user or an authorized viewer may have the ciphertext decrypted back into plaintext. This encryption and decryption process allows a user to create and access private data in plaintext form while preventing unauthorized access to the private data when stored and/or transmitted in ciphertext form.

Encryption and decryption are conventionally performed by processing an input (plaintext or ciphertext, respectively) using a cryptographic key to generate a corresponding output (ciphertext or plaintext, respectively). A cryptographic system that uses the same key for both encryption and decryption is categorized as a symmetric cryptographic system. One popular symmetric cryptographic system is the Advanced Encryption Standard (AES), which is described in Federal Information Standards (FIPS) Publication 197.

Cryptographic systems may be used, for example, in a virtualized server environment, which allows a single physical server platform to be shared by multiple virtual machines (VMs). Note that the single physical server, which may comprise multiple processor cores on multiple IC devices, is operated as a single platform. The physical platform supports a hypervisor program, which manages the operation of multiple VMs on the physical platform. Note that a particular VM managed by the hypervisor may be actively running on the physical platform or may be stored in a memory in a suspended state. An active VM may access multiple different memory types and/or locations, some of which may be accessible to other VMs and/or other programs running on the platform (such as, for example, the hypervisor itself). A VM may also access the memory contents of another VM, or the memory contents of the hypervisor, provided that access control permits such accesses. In order to protect the confidentiality of each VM against physical attacks such as DRAM probing/snooping, a portion—up to the entirety—of its contents may be encrypted. For effective security, each VM should use a unique (i.e., exclusive) corresponding cryptographic key. Systems and methods to manage keys for encryption and/or decryption of VM code and data may be useful.

Relatedly, cryptographic systems may also be used, for example, to separately encrypt each of a plurality of file systems that share one memory-storage system. Data-at-rest cryptographic systems may be used for such file protection, whether the files are stored on magnetic storage media, RAM, or elsewhere. An example of a cryptographic system typically used for data-at-rest protection is the AES in XEX-based tweaked-codebook mode with ciphertext stealing (XTS). Similar systems and methods to manage cryptographic keys for storage-sharing file systems may also be useful.

SUMMARY

The following presents a simplified summary of one or more aspects in order to provide a basic understanding of such aspects. This summary is not an extensive overview of all contemplated aspects, and is not intended to either identify key critical elements of all aspects or delineate the scope of all aspects. Its sole purpose is to present some concepts of one or more aspects in a simplified form as a prelude to the more detailed description that is presented later.

In one embodiment, an integrated circuit (IC) system comprises a first processor, a first memory controller, and a first random-access memory (RAM). The first memory controller comprises a memory cryptography circuit connected to the first processor and the first RAM. The memory cryptography circuit comprises a keystore. The keystore comprises a key-expansion engine. The keystore is configured to receive a key identifier and provide to the key-expansion engine a first key-expansion input based on the key identifier. The key-expansion engine is configured to perform a key-expansion operation on the first key-expansion input to generate an expanded cryptographic key.

In another embodiment, a method for an integrated circuit (IC) system having a first processor, a first memory controller, and a first random-access memory (RAM), wherein the first memory controller includes a memory cryptography circuit connected to the first processor and the first RAM, the memory cryptography circuit has a keystore, and the keystore has a key-expansion engine, comprises (a) receiving, by the keystore, a key identifier, (b) providing, by the keystore, to the key-expansion engine a first key-expansion input based on the key identifier, and (c) performing, by the key-expansion engine, a key-expansion operation on the first key-expansion input to generate an expanded cryptographic key.

In yet another embodiment, a non-transitory computer readable medium has instructions stored thereon for causing an IC system comprising a first processor, a first memory controller, and a first random-access memory (RAM), wherein the first memory controller comprises a memory cryptography circuit connected to the first processor and the first RAM, the memory cryptography circuit comprises a keystore, and the keystore comprises a key-expansion engine, to perform a method. The method comprises receiving, by the keystore, a key identifier, providing, by the keystore, to the key-expansion engine a first key-expansion input based on the key identifier, and performing, by the key-expansion engine, a key-expansion operation on the first key-expansion input to generate an expanded cryptographic key.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
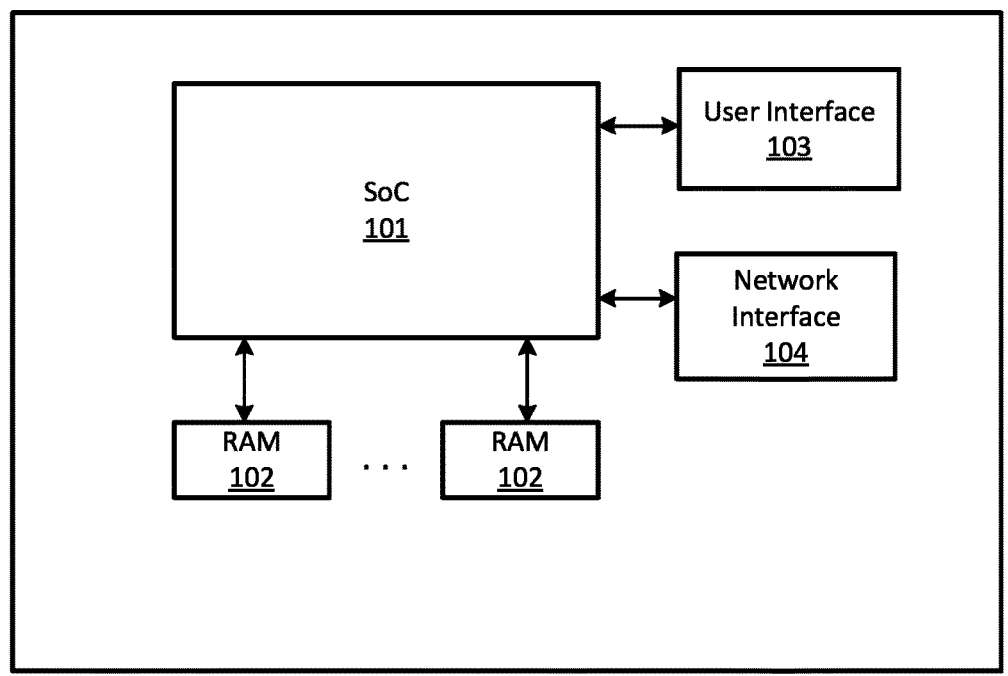
FIG. 1 is a simplified schematic diagram of a computer system in accordance with one embodiment of the disclosure.

Various embodiments are now described with reference to the drawings. In the following description, for purposes of explanation, numerous specific details are set forth in order to provide a thorough understanding of one or more embodiments. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples. Note that, for ease of reference and increased clarity, only one instance of multiple substantially identical elements may be individually labeled in the figures.

In some embodiments, each VM runs within a corresponding protected software environment (PSE). The PSEs are managed by PSE management software. Note that cryptographic protection may be applied to any arbitrary software layer (e.g., firmware, hypervisor, VM/kernel, driver, application, process, sub-process, thread, etc.). Any such software may function inside of a PSE. The hypervisor would typically be the PSE management software for PSEs that encapsulate VMs, and the OS kernel would typically be the PSE management software for PSEs that encapsulate applications. In general, the PSE management software role would typically be fulfilled by the software running at the next-higher privilege level from the software contained within a PSE.

Note that some cryptographic systems use unique key seeds to generate corresponding cryptographic keys for association with corresponding PSEs. For example, a 128-bit key seed may be used to generate a 256-bit cryptographic key (with 128 bits of security strength) by providing the 128-bit key seed to a key-expansion engine that then outputs a corresponding 256-bit cryptographic key. Note that a cryptographic key may be a compound key that comprises 2 or more sub-keys. For example, a 256-bit cryptographic key may comprise two distinct 128-bit sub-keys, where the overall security strength is 128 bits. The two sub-keys may then be used in cryptographic systems that require two distinct keys for cryptographic processing, such as, for example AES-XEX and AES-XTS.

Some cryptographic systems use a shared, or global, key seed in conjunction with a nonce to generate corresponding cryptographic keys for association with corresponding PSEs. For example, a 128-bit shared key seed may be used in conjunction with a unique instance counter to generate a unique 128-bit or 256-bit cryptographic key for a corresponding PSE. The instance counter is a counter that is incremented for each new PSE for which a cryptographic key is generated, and, consequently, should never repeat. In general, a cryptographic key that is generated by a key expansion, derivation, or similar function, is referred to herein as an expanded cryptographic key. As used herein, a key seed may refer to any data input into a key-expansion or key-derivation function and/or a corresponding key-expansion or key-derivation module.

Embodiments of the present disclosure include systems and methods for efficient management of a first plurality of cryptographic keys. The cryptographic keys may be associated with a first plurality of corresponding PSEs (e.g., encapsulating virtual machines) supervised by PSE management software (e.g., a hypervisor) running on a computer system and configured to supervise a superset of the first plurality of PSEs. The computer system stores at least the currently unused keys and/or key seeds of the superset in a relatively remote, cheap, large, and slow memory (e.g., DDR SDRAM) in encrypted form and manages the keys of the first plurality using a key-expansion engine in conjunction with a relatively near, fast, small, and expensive memory (e.g., on-chip SRAM). Note that the relatively remote memory may also store copies of the currently used keys and/or key seeds of the first plurality of PSEs in addition to the currently unused keys and/or key seeds of the superset.

In some embodiments, a computer system comprising one or more processors and capable of parallel processing is configured to support the secure and simultaneous (that is, parallel) operation of a plurality of PSEs, wherein the plurality of PSEs has a corresponding plurality of cryptographic keys—in other words, each PSE is associated with a corresponding cryptographic key. In addition, the computer system has a random-access memory shared by the plurality of PSEs. The computer system has a memory cryptography circuit (MCC) connected to the one or more processors and the shared memory, where the MCC includes a cryptography engine and a keystore for managing a subset of the plurality of cryptographic keys. Note that the term cryptographic engine may refer to an encryption engine, a decryption engine, or a combination engine.

During data transmission operations between the processor and the shared memory (for example, in the fetching of processor instructions, data reads, and data writes—generically referred-to herein as memory-transaction requests), the cryptography engine encrypts or decrypts the transmitted data (for example, processor instructions) using a corresponding cryptographic key provided by the keystore. The implementation of the MCC in hardware or firmware and the management of likely-to-be-used keys in the keystore helps to allow for the rapid and efficient execution of cryptographic operations on the transmitted data.

FIG. 1 is a simplified schematic diagram of a computer system 100 in accordance with one embodiment of the disclosure. Computer system 100 comprises a system on chip (SoC) 101 and one or more SoC-external random-access memory (RAM) modules 102, which may be, for example, double data rate (DDR) synchronous dynamic RAM (SDRAM) or any other suitable RAM. The computer system 100 also comprises user interface 103 and network interface 104. Note that, as would be appreciated by a person of ordinary skill in the art, the computer system 100, as well as any of its components, may further include any suitable assortment of various additional components (not shown) whose description is not needed to understand the embodiment.

Figure 2:
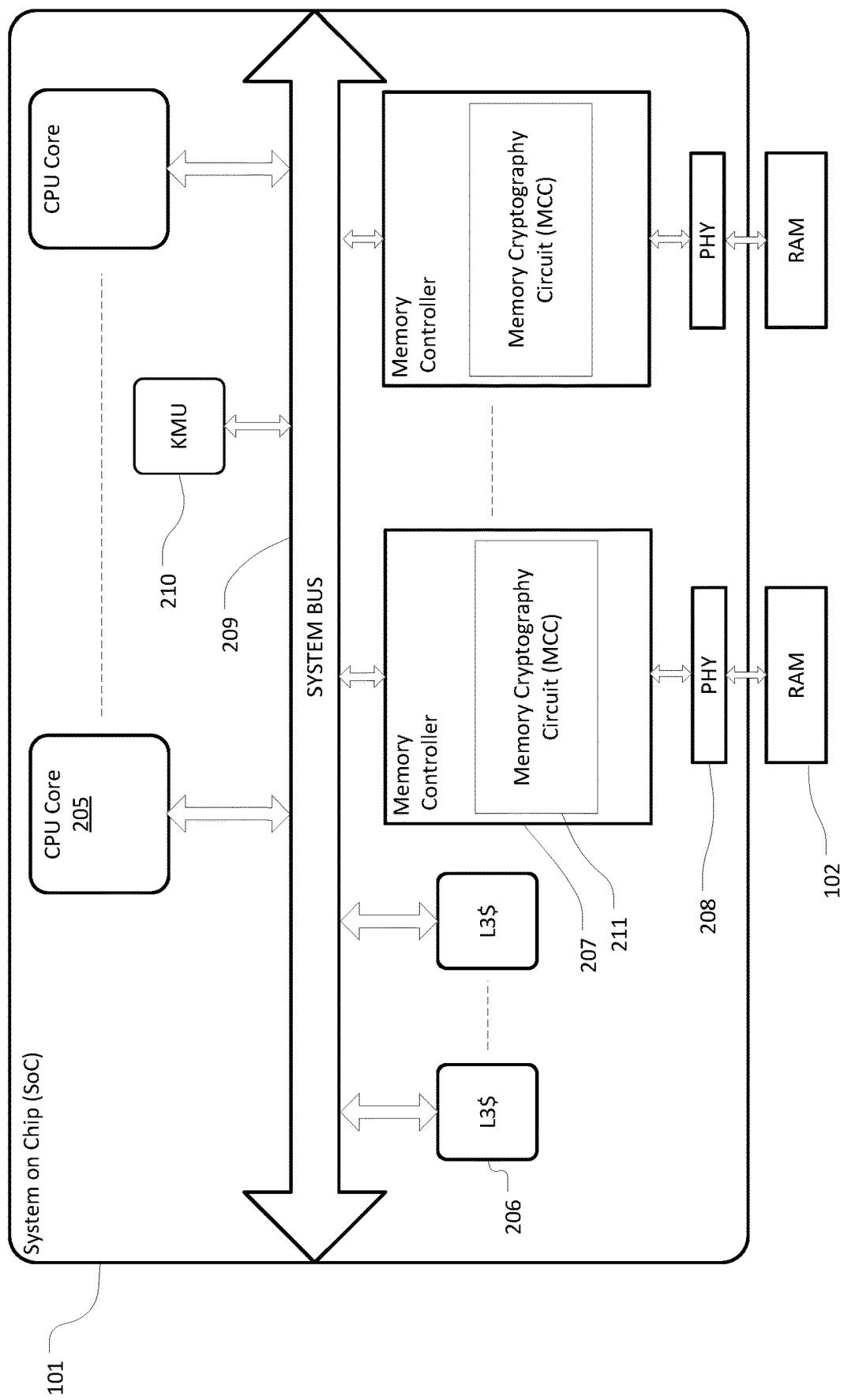
FIG. 2 is a simplified schematic diagram of a detailed portion of the computer system of FIG. 1.

FIG. 2 is a simplified schematic diagram of a detailed portion of the computer system 100 of FIG. 1 comprising SoC 101 and RAM modules 102. The SoC 101 comprises one or more central processing unit (CPU) cores 205, each of which may be a single-threaded or multi-threaded processor. Each CPU core 205 may include L1 and L2 caches (not shown). The SoC 101 may further comprise one or more L3 caches 206, one or more memory controllers 207, one or more physical layer (PHY) interfaces 208, and a system bus 209. The SoC 101 may further comprise a key management unit (KMU) 210, which may be implemented as a discrete standalone module as shown, as a distributed module within two or more CPU cores 205, or in any suitable manner. The system bus 209 interconnects the CPU cores 205, L3 caches 206, KMU 210, and memory controllers 207, along with any other peripheral devices which may be included within the SoC 101.

The memory controller 207 comprises a memory cryptography circuit (MCC) 211 and may further comprise interface modules (not shown), such as, for example, a bus interface, for interfacing between the MCC 211 and other components of the SoC 101. The memory controller 207 is communicatively coupled to a corresponding PHY interface 208, which is, in turn, communicatively coupled to a corresponding external RAM module 102.

The computer system 100 may support the management, by PSE management software, of a plurality of PSEs, where a subset of the plurality of PSEs may run simultaneously as parallel processes. The computer system 100 supports parallel processing by multiple CPU cores 205. In some implementations, one or more of the CPU cores 205 may be configured to execute multiple threads in parallel. Note that in some alternative embodiments, the computer system 100 may have only one CPU core 205, which, however, supports multi-threaded processing and, consequently, parallel processing. Further note that in some alternative embodiments, the computer system 100 may comprise two or more SoCs coherently connected through chip-to-chip interfaces to form a multi-socket system.

The computer system 100 may support a large number of PSEs, each associated with a unique cryptographic key seed, as well as its corresponding expanded key, which allows for the secure sharing of RAM modules 102 by the CPU cores 205 and allows the PSEs to operate securely from snooping by other processes such as, for example, other PSEs, the PSE management software, and potential hacking attackers. The SoC 101 may be designed to use time-slicing to support an almost-simultaneous execution of an operating number of PSEs that is greater than the number of parallel processes simultaneously supportable by the SoC 101 on the corresponding CPU cores 205, but lesser than the arbitrarily large total number of PSEs supportable by the computer system 100. As will be explained in greater detail below, the KMU 210 manages the cryptographic key seeds and their corresponding key identifiers (KIDs) for the PSEs supported by the computer system 100. Note that a KID may also be considered to be a PSE tag.

As will be explained in greater detail below, in operation, when a first PSE running on a first CPU core 205 needs to write a data block to an RAM 102, the data block is encrypted by the MC circuit 211 using a first expanded cryptographic key uniquely corresponding to the first PSE. The corresponding encrypted data block is then written to a first RAM module 102. When the first PSE needs to read a data block from a RAM module 102, the retrieved data block, which is encrypted on the RAM module 102, is decrypted by the MC circuit 211 using the first expanded cryptographic key. The corresponding decrypted data block is then transmitted to the CPU core 205 on which the first PSE is running. Note that writing to and reading from the RAM modules 102 may be performed as part of routine instruction execution by the CPU cores 205.

Figure 3:
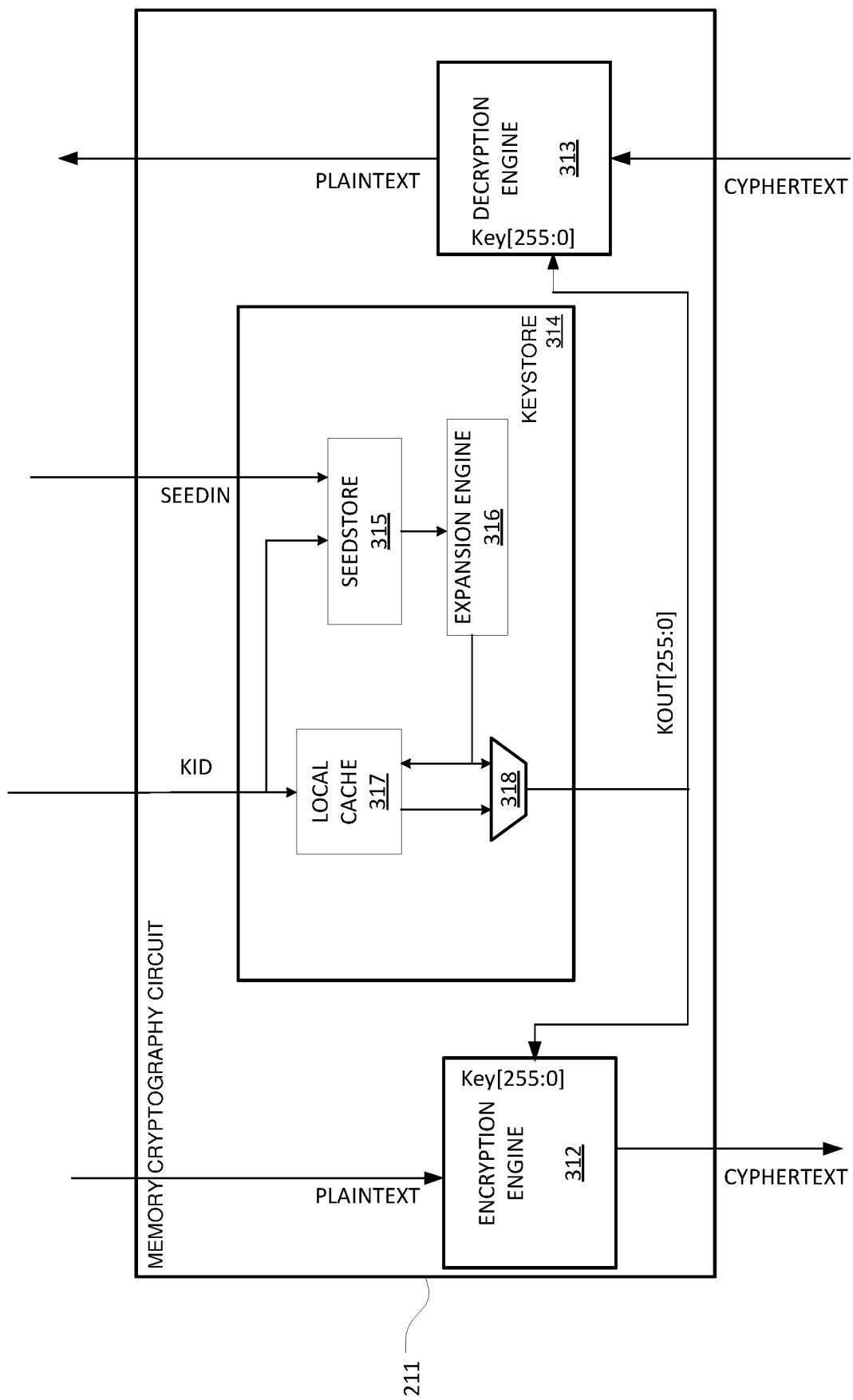
FIG. 3 is a simplified schematic diagram of the memory cryptography circuit of FIG. 2.

FIG. 3 is a simplified schematic diagram of one embodiment of the memory cryptography circuit 211 of FIG. 2. MC circuit 211 comprises an encryption engine 312, a decryption engine 313, and a keystore 314. The encryption engine 312 is a circuit configured to receive a block of plaintext— e.g., from a CPU core 205—and an expanded cryptographic key from the keystore 314, encrypt the plaintext with the expanded cryptographic key using an encryption algorithm such as, for example, AES using an appropriate cipher mode of operation, and output a corresponding block of ciphertext—e.g., to a RAM module 102. The decryption engine 313 is a circuit configured to receive a block of ciphertext— e.g., from a RAM module 102—and an expanded cryptographic key from the keystore 314, decrypt the plaintext with the expanded cryptographic key using a decryption algorithm such as, for example, AES using an appropriate cipher mode of operation, and output a corresponding block of plaintext—e.g., to a CPU core 205.

The keystore 314 comprises a seedstore 315, an expansion engine 316, a local cache 317, and an arbiter 318. The seedstore 315 may be, for example, an SRAM module, a register file, or a similarly fast-access RAM configured to addressably store and update a plurality of key seeds using their corresponding KIDs. Similarly, the cache 317 may be an SRAM module or similarly fast-access RAM configured to store and update a smaller plurality of expanded keys and their corresponding KIDs. In other words, the cache 317 may support management of an associative array. The cache 317 may comprise a content-addressable memory (CAM) for finding expanded keys by their corresponding KIDs. The expansion engine 316 may receive one or more key seeds from the seedstore 315 and output a corresponding expanded key that is then provided to the arbiter 318 (for possible provision to the encryption engine 312 or the decryption engine 313) and the cache 317.

The seedstore 315 may be configured to store a relatively large plurality of key seeds indexed by their corresponding KIDs. The KMU 210 is configured to manage the storage of key seeds and KIDs in the seedstore 315. For example, if the computer system 100 supports a number of PSEs larger than the number of key seeds storable by the seedstore 315, then the KMU 210 determines which PSE's key seeds are stored by the seedstore 315 and their corresponding KID.

The seedstore 315 is configured to receive key seeds and/or control commands from the KMU 210 via a configuration interface. The KMU 210 may provide, for example, a PSE's 128-bit key seed and the PSE's KID. In response, the seedstore 315 may store the received key seed at the seedstore address indicated by the KID. The seedstore 315 is also configured to output to the expansion engine 316 the seed stored at the keystore address indicated by the KID in response to receiving a KID that is part of a memory-transaction request (e.g., as a result of a cache miss). Note that both read and write memory-transaction requests for the RAM 102 are transmitted via the system bus 209 and include the KID corresponding to the requesting PSE.

Note that in addition to being carried on the system bus 209, the KID may also be stored in the L1/L2/L3 caches, where each cache line carries the KID along with a memory address and data. As noted elsewhere herein, the KID is the index used to obtain the corresponding expanded cryptographic key for the requesting PSE from the keystore 314.

When a memory-transaction request is received by the MC circuit 211, the KID is provided to the keystore 314. The KID is provided to the cache 317 and the seedstore 315. If the cache 317 has a valid record for the KID (in other words, if there is a cache hit, or the KID matches), then the cache 317 provides the corresponding expanded key to the arbiter 318, which in turn provides the expanded key as the output of the keystore 314 to the cryptographic engines 312 and 313 for corresponding cryptographic processing (i.e., encryption or decryption using the expanded key).

If the cache 317 does not have a valid record for the KID (in other words, if there is a cache miss, or the KID does not match), then the seedstore 315 looks up the KID and provides the corresponding key seed located at the KID-corresponding address to the expansion engine 316. The expansion engine 316 then performs a key expansion function using the received key seed and outputs the corresponding expanded key to the arbiter 318 and the cache 317. The arbiter 318 provides the expanded key to the cryptographic engines 312 and 313. Meanwhile, the expanded key and its corresponding KID are entered into the cache 317 (to update the cache 317), possibly evicting another entry from the cache 317.

In some alternative embodiments, the keystore 314 lacks the cache 317 and arbiter 318 and, as a result, memory-transaction requests are handled as though they all resulted in cache misses. Accordingly, whenever a memory-transaction request is received by the MC circuit 211, the seedstore 315 provides the key seed corresponding to the received KID to the expansion engine 316, which, in turn, performs a key expansion on the key seed to generate the corresponding expanded key for provision to the cryptographic engines 312 and 313.

Note that the processing of a read request from the CPU core 205 may involve buffering by the MC circuit 211 of a corresponding expanded key until the corresponding ciphertext block located at the requested memory address is retrieved from the RAM 102, at which point the ciphertext block and the expanded key are provided to the decryption engine 313 for decryption.

In one example implementation, the SoC 101 may comprise sixteen single-threaded CPU cores 205, thereby allowing sixteen unique PSEs to run simultaneously. The PSE management software may be a program running distributed across one, some, or all of the CPU cores 205. The SoC 101 may be configured to support thousands of PSEs and support time-slicing up to 128 PSEs at any one time. In other words, during normal operation, thousands of PSEs are suspended (in other words, are semi-dormant), while, scores of PSEs may be executing by time-slice sharing the sixteen CPU cores 205 of the SoC 101. The cache 317 may be configured to store 128 expanded keys and the seedstore 315 may be configured to store 4,096 key seeds, where a key seed's address in the seedstore 315 is the KID for the key seed. Consequently, the KID may be a 12-bit number (as $2^{12}$=4,096) corresponding to a seedstore 315 address. In an alternative embodiment, the cache 317 may be configured to store only 32 expanded keys, which would likely require more frequent cache evictions, but provides cost and power savings.

If the computer system 100 supports more than 4,096 PSEs, then the KMU 210 may manage the key seeds of the excluded PSEs, which are operationally dormant and which do not have corresponding KIDs. If the computer system 100 determines that a dormant PSE is to be activated, then the KMU 210 assigns that PSE a KID and provides that KID and corresponding key seed to the seedstore 315, possibly evicting another PSE's key seed from the seedstore 315. The KMU 210 suitably handles situations where an evicted PSE has corresponding encrypted blocks remaining in the RAM module 102 at the time of eviction. The KMU 210 may store the key seeds of the excluded/dormant PSEs (as well as copies of the key seeds of the included/semi-dormant and/or active PSEs) in a relatively remote, cheap, large, and slow memory (e.g., DDR SDRAM) in encrypted form and retrieve them as needed.

Figure 4:
FIG. 4 is a schematic representation of an exemplary data packet in accordance with one embodiment of the computer system of FIG. 2.

FIG. 4 is a schematic representation of an exemplary data packet 400 in accordance with one embodiment of the computer system 100 of FIG. 2. The data packet 400 includes a data payload 401, a KID 402, and a header 403. In one example implementation, (i) the data payload field 401 is at least 128 bits so as to be able to contain an entire 128-bit standard AES block, and (ii) the KID field is at least 12 bits to support addressing 4,096 cryptographic-key locations in the keystore 314. The header 403 may contain any suitable header information, such as, for example, attribute information for transmission of the data packet 400 on the system bus 209 (e.g., memory address, read/write indicator, source address for routing response, etc.). Note that a read-request packet may include only a KID 402 and a header 403, including a memory address, with no payload. Relatedly, a read-response packet may include only a data payload 401 and a header 403 with no KID. Note further that the KID 402, when used, does not have to be an exclusive-use segment of the data packet and may be, for example, part of the header and/or used for purposes other than identifying a key location in the seedstore 315.

Figure 5:
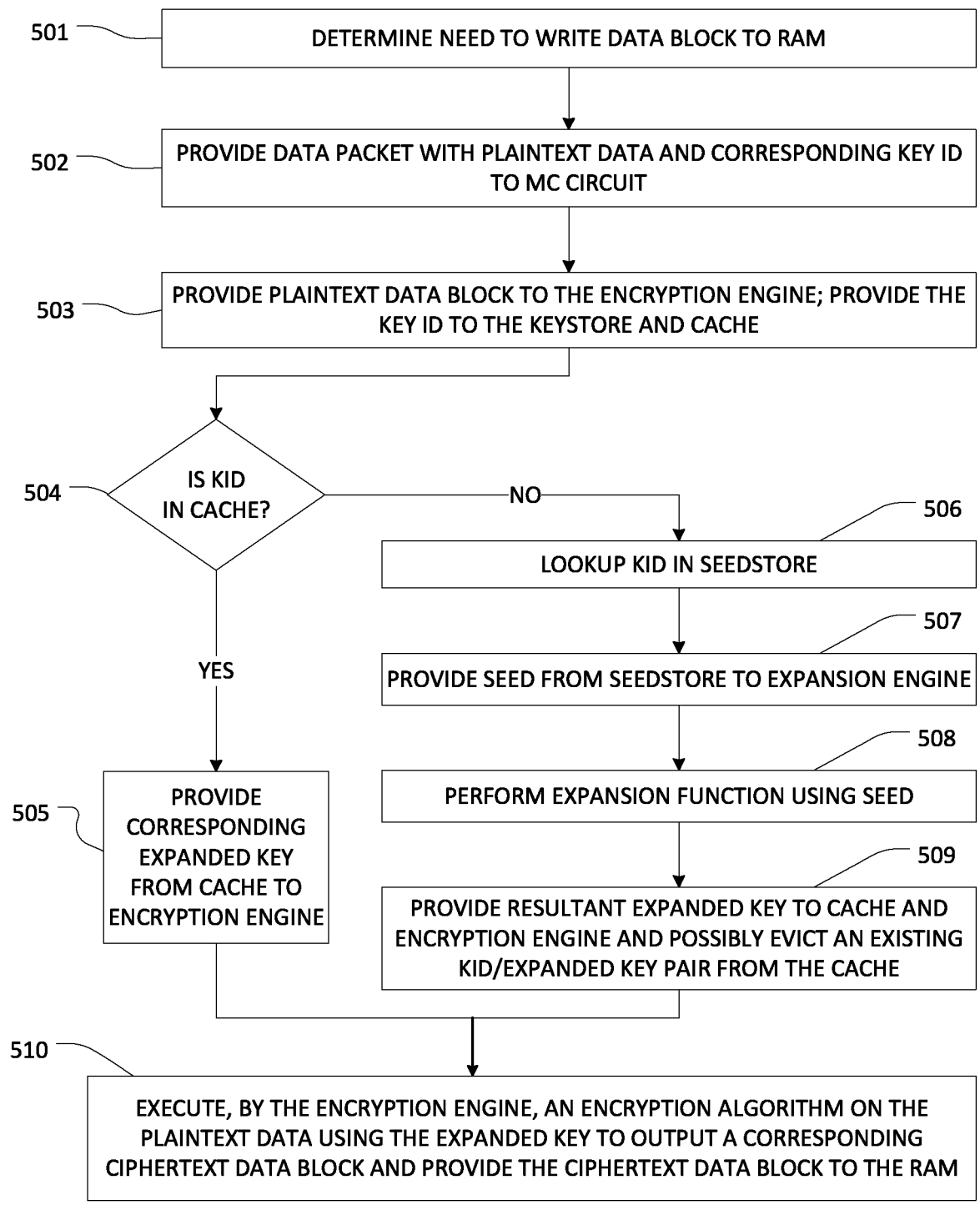
FIG. 5 is a flowchart for a process in accordance with one embodiment.

FIG. 5 is a flowchart for a process 500 in accordance with one embodiment. The process 500 starts when a determination is made by a writing module that a data block needs to be written to a RAM module 102 (step 501). The writing determination may be made by, for example, a first PSE executing on a first CPU 205 that needs to directly write a block to memory or a first cache that needs to evict a cache line. Note that, in general, write requests from a PSE executing on a CPU 205 may be cached and, while in the cache hierarchy of SoC 101, the data block is associated with the KID of the PSE. The writing module provides to the MC circuit 211, via the system bus 209, a corresponding data packet 400, which comprises the plaintext data block in the data payload 401 and the KID corresponding to the first PSE in the KID field 402 (step 502). Note that the data payload 401 may include suffix and/or prefix padding bits together with the data block. The data payload 401 is provided to the encryption engine 312 and the KID is provided to the keystore 314 and cache 317 (step 503).

The cache 317 searches for the KID (step 504). If the KID is found in the cache 317 (i.e., cache hit in step 504), then the cache 317 provides the corresponding expanded key to the encryption engine via the arbiter 318 (step 505). If the KID is not found in the cache 317 (i.e., cache miss in step 504), then the seedstore 315 looks up the KID to find the corresponding key seed (step 506). The seedstore 315 then provides the corresponding key seed to the expansion engine 316 (step 507). The expansion engine 316 perform an expansion function using the received key seed to generate an expanded key (step 508). The expansion engine 316 provides the resultant expanded key to the cache 317 and, via the arbiter 318, to the encryption engine 312 (step 509). The cache 317 stores the expanded key and corresponding KID, which may require evicting a least used, randomly selected, or otherwise selected cache line. After an expanded key is provided to the encryption engine in step 505 or step 509, the encryption engine 312 executes an encryption algorithm (e.g., AES encryption) on the received plaintext data using the received expanded key and outputs a corresponding ciphertext data block that is provided to the RAM module 102 (step 510).

Figure 6:
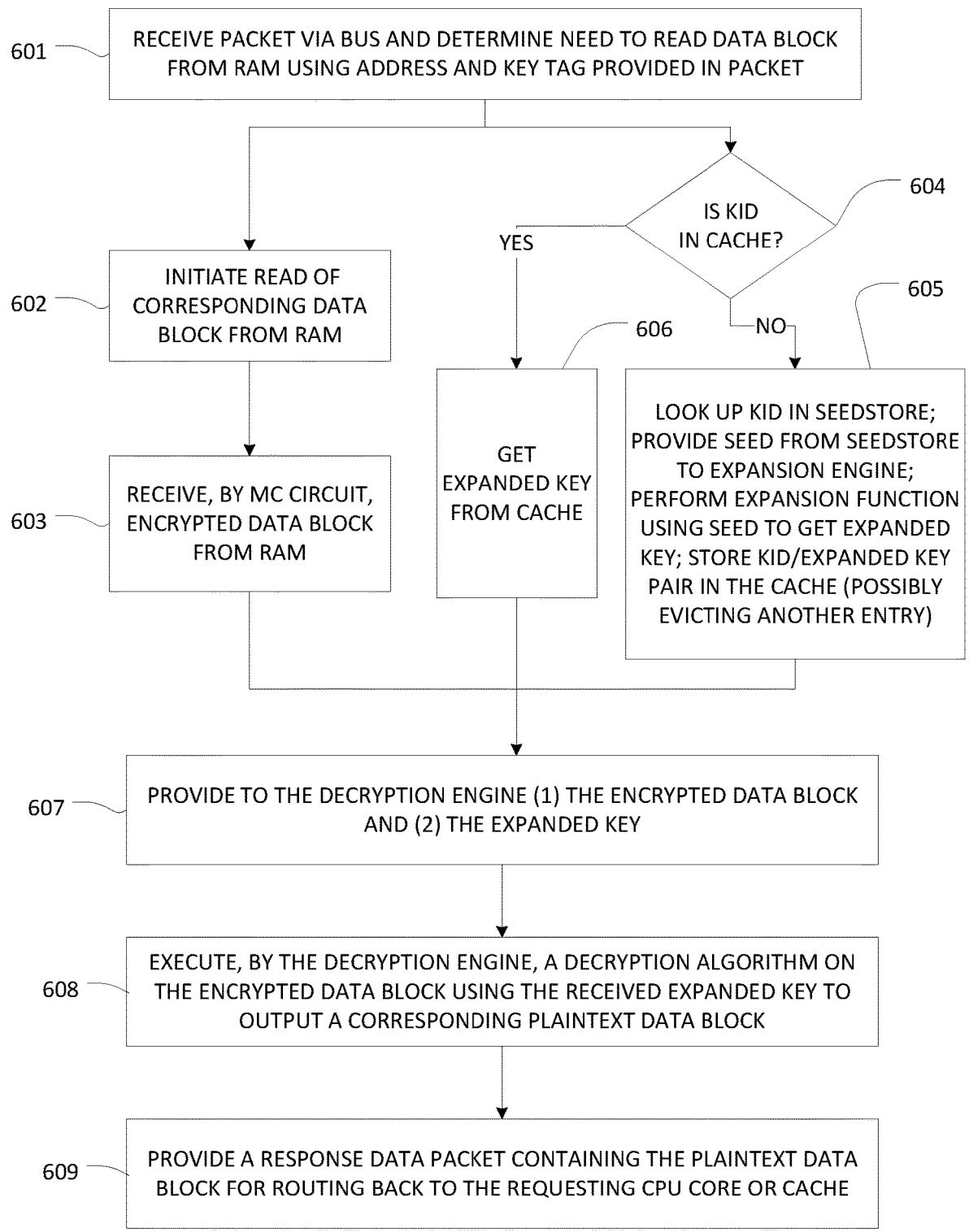
FIG. 6 is a flowchart of a process in accordance with one embodiment.

FIG. 6 is a flowchart of a process 600 in accordance with one embodiment. The process 600 starts when the memory controller 207 receives a data packet via the bus interface and determines that a data block needs to be read (i.e., retrieved) from the RAM module 102 using the address and KID provided in the data packet (step 601). The data packet may be received from, for example, a CPU core 205, an L2 cache, or an L3 cache 206. The memory controller 207 initiates a read of the corresponding data block from the RAM module 102 (step 602) and, in parallel, obtains the corresponding expanded key (steps 604, 605, and/or 606). Obtaining the expanded key includes determining whether the KID is in the cache 317 (step 604); if so, then getting the expanded key from the cache 317 (step 606); and if not, then looking up the KID in the seedstore 315 to locate the corresponding key seed, providing the corresponding seed to the expansion engine 316, and performing an expansion function using the key seed to get the expanded key (step 605). The expansion engine 316 provides the resultant expanded key to the cache 317, and buffers the expanded key until the MC circuit 211 receives the requested encrypted data block from the RAM module 102 (step 603). The cache 317 stores the expanded key and corresponding KID, which may require evicting a least used, randomly selected, or otherwise selected cache line.

The decryption engine 313 is provided (1) the retrieved encrypted data block and (2) the expanded key (step 607). The decryption engine 313 executes a decryption algorithm (e.g., AES decryption) on the received encrypted data block using the received expanded key and outputs a corresponding plaintext data block (step 608). The memory controller 207 provides a response data packet containing the plaintext data block for routing back to the requesting CPU core or cache (step 609).

Figure 7:
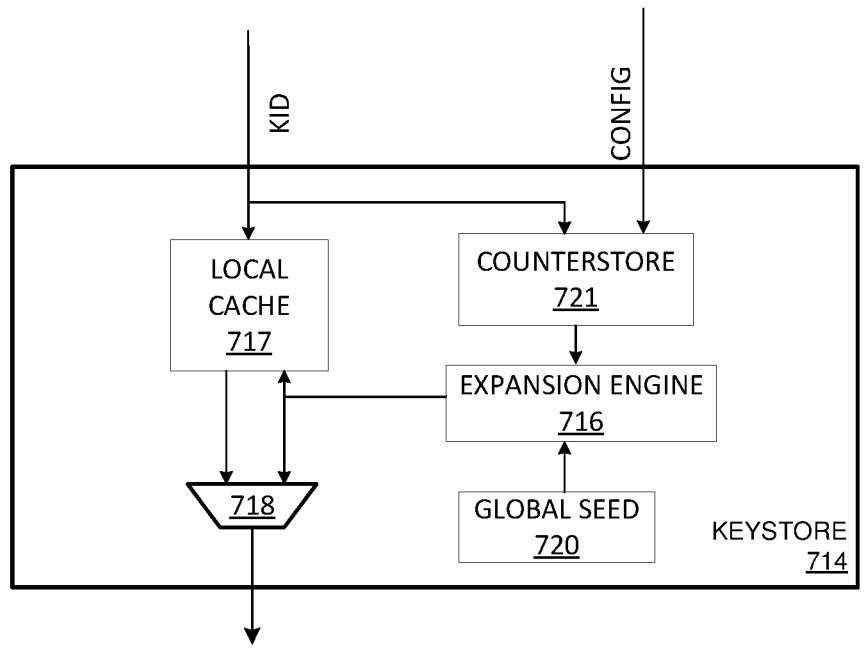
FIG. 7 is a simplified schematic diagram of a keystore in accordance with an alternative embodiment.

FIG. 7 is a simplified schematic diagram of a keystore 714 in accordance with an alternative embodiment. The keystore 714 may be used in place of the keystore 314 of FIG. 3. The keystore 714 comprises a local cache 717, an expansion engine 716, a counterstore 721, a global-seed store 720, and an arbiter 718. The cache 717 and arbiter 718 operate substantially the same as, respectively, the cache 317 and arbiter 318 of keystore 314. The computer system (not shown) incorporating keystore 714 uses a shared key seed stored in global-seed store 720 and a unique counter value for each PSE to generate a corresponding expanded key for the PSE. As described above, when a new PSE is instantiated, it receives a new incremental counter value that functions as a nonce. A corresponding KMU (not shown) manages the maintenance of the counter values and their associations with corresponding PSEs and updates the counterstore 721 accordingly.

Figure 8:
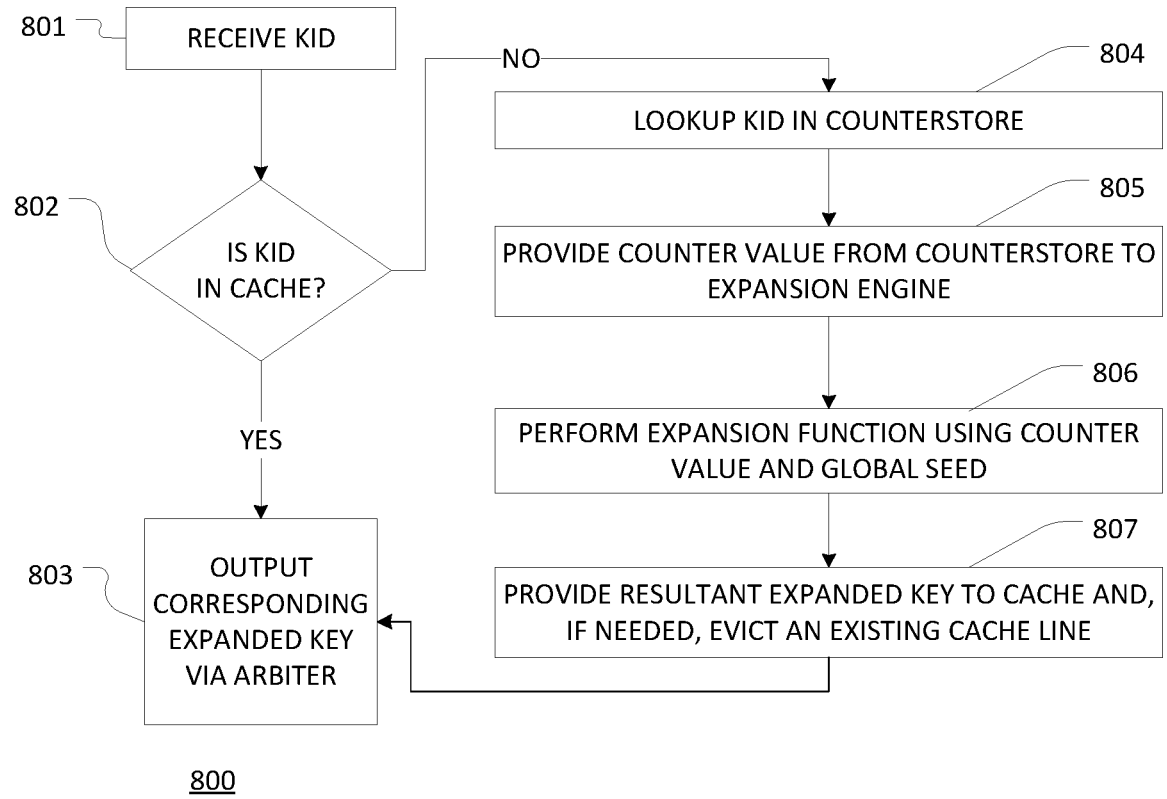
FIG. 8 is a flowchart for a process for the keystore of FIG. 7, in accordance with an embodiment of the disclosure.

FIG. 8 is a flowchart for a process 800 for the keystore 714 of FIG. 7, in accordance with an embodiment of the disclosure. When the keystore 714 receives a KID with a memory-access request (step 801), the cache 717 looks up the KID (802). If the KID is found in the cache 717, then the corresponding expanded key is provided to the arbiter 718 to provide as the output of keystore 714 (step 803). If the KID is not found in the cache 717 (step 802), then the counterstore looks up the KID (step 804) to obtain the corresponding counter value, which is provided to the expansion engine 716 (step 805). Note that the counter value is a KID-based key-expansion value. The expansion engine 716 then performs an expansion operation using the counter value and the global seed obtained from the global-seed store 720 to generate an expanded cryptographic key (step 806). The expansion engine 716 provides the resultant expanded key to the key cache 717, which stores the expanded key and corresponding KID (step 807). Notably, this cache update may require the eviction of an existing cache line storing a KID and a corresponding expanded key (step 807). The expanded key is also provided to the arbiter 718 for provision as the output of the keystore 714 (step 803).

Figure 9:
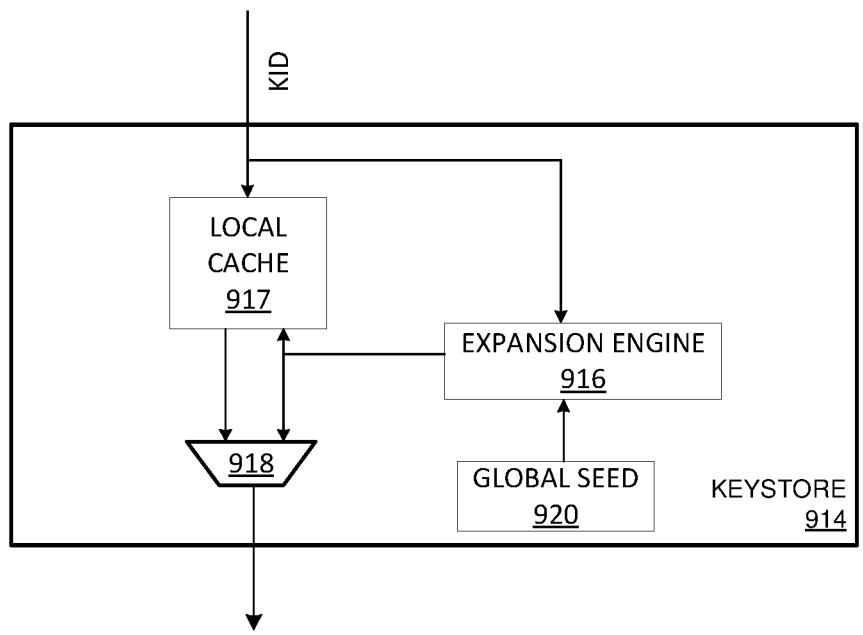
FIG. 9 is a simplified schematic diagram of a keystore in accordance with another alternative embodiment.

FIG. 9 is a simplified schematic diagram of a keystore 914 in accordance with another alternative embodiment. The keystore 914 may be used in place of the keystore 314 of FIG. 3. The keystore 914 comprises a local cache 917, an expansion engine 916, a global-seed store 920, and an arbiter 918. The cache 917 and arbiter 918 operate substantially the same as, respectively, the cache 317 and arbiter 318 of keystore 314. The computer system (not shown) incorporating the keystore 914 uses a shared key seed stored in global-seed store 920 and the KID of each PSE to generate a corresponding expanded key for the PSE. A corresponding KMU (not shown) may manage the associations of KIDs with corresponding PSEs.

Figure 10:
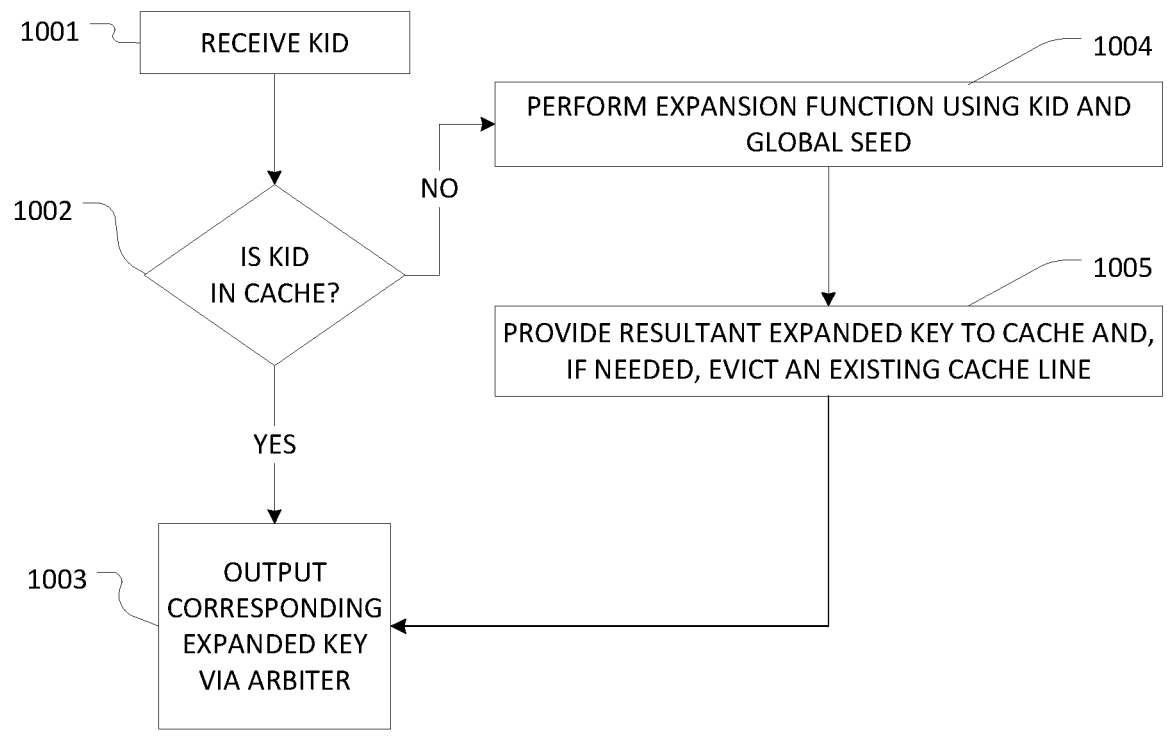
FIG. 10 is a flowchart for a process for the keystore of FIG. 9, in accordance with an embodiment of the disclosure.

FIG. 10 is a flowchart for a process 1000 for the keystore 914 of FIG. 9, in accordance with an embodiment of the disclosure. When the keystore 914 receives a KID with a memory-access request (step 1001), the cache 917 looks up the KID (step 1002). If the KID is found in the cache 917, then the corresponding expanded key is provided to the arbiter 918 to provide as the output of the keystore 914 (step 1003). If the KID is not found in the cache 917 (step 1002), then the expansion engine 916 performs an expansion operation using the KID and the global seed obtained from the global-seed store 920 to generate an expanded cryptographic key (step 1004). Note that the counter value is a KID-based key-expansion value. The expansion engine 916 provides the resultant expanded key to the key cache 917, which stores the expanded key and corresponding KID (step 1005). Notably, this cache update may require the eviction of an existing cache line storing a KID and a corresponding expanded key (step 1005). The expanded key is also provided to the arbiter 918 for provision as the output of the keystore 914 (step 1003).

In one exemplary implementation of the MC circuit 211 of FIG. 3, where 128-bit seeds are used to generate 256-bit expanded keys, the keystore 314 can simulate the storing of 4,096 256-bit keys using a little more than half the storage space that actually storing 4,096 256-bit keys would require. In an exemplary implementation of the keystore 714 of FIG. 7, where instance counters are stored in the counterstore 721 that is addressed by the KID, and the instance counters are used in conjunction with a global key seed to derive keys, the keystore 714 can simulate the storing of 4,096 256-bit keys using a little more than a fifth of the storage space that actually storing 4,096 256-bit keys would require—presuming the use of a 56-bit counter, which would allow the provision of a new and unique counter value every 10 nanoseconds for over 20 years. Note that a PSE gets a new counter value when the PSE is instantiated. In an exemplary implementation of the keystore 914 of FIG. 9, where the total number of keys supported in the system is limited to the number of possible values of KID (e.g. 4,096 total keys for a 12-bit KID), the KID can be used directly with the global key seed to derive keys, and the keystore 914 can simulate the storing of 4,096 keys using only the storage space of the local cache 917 and the global seed 920.

It should be noted that the above-described memory cryptography circuits may be used in systems other than computer system 100. For example, MC circuit 211 may be used in the management of encryption of so-called data at rest stored on shared non-volatile memory by a plurality of filesystems, where each filesystem has a corresponding key seed and expanded key, similar to the above-described PSEs. The memory cryptography circuit may be used in any suitable system where a relatively large plurality of clients and corresponding cryptographic seeds are managed. Furthermore, note that embodiments of the disclosure are not limited to systems for running multiple PSEs. Rather, in general, the MC circuit may be used in any system that uses a plurality of expanded cryptographic keys having corresponding keys seeds that can be expanded into the expanded cryptographic keys when needed.

Generic terms may be used to describe the steps of the above-described read and write processes 500 and 600. Determining needs to write or read data is determining a need to transfer data between the first PSE and a RAM module 102. Ciphertext and plaintext are data. Encryption and decryption are cryptographic operations, which take a first data block and output a first cryptographically corresponding data block.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A memory cryptography circuit comprising a keystore and a key-expansion engine, wherein:
   the memory cryptography circuit is connected to a processor and a random-access memory (RAM);
   the keystore is configured to:
      receive a key identifier; and
      provide to the key-expansion engine a first key-expansion input based on the key identifier;
   the key-expansion engine is configured to perform a key-expansion operation on the first key-expansion input to generate an expanded cryptographic key;
   the memory cryptography circuit comprises a first cryptographic engine configured to receive the expanded cryptographic key and an input block;
   the first cryptographic engine is configured to process the input block using the expanded cryptographic key to output a corresponding output block;
   the memory cryptography circuit is configured to perform one of receiving the input block from the RAM and transmitting the output block to the RAM;
   the input block is one of a plaintext block and a cyphertext block;
   if the input block is a plaintext block, then:
      the corresponding output block is a ciphertext block; and
      the first cryptographic engine is an encryption engine configured to:
         receive the expanded cryptographic key and the input block; and
         encrypt the input block using the expanded cryptographic key to output the corresponding output block for transmission to the RAM; and
   if the input block is a cyphertext block, then:
      the cyphertext block is received from the RAM;
      the corresponding output block is a plaintext block; and
      the first cryptographic engine is a decryption engine configured to:
         receive the expanded cryptographic key and the input block; and
         decrypt the input block using the expanded cryptographic key to output the corresponding output block.

2. The circuit of claim 1, wherein:
   the input block is a plaintext block;
   the corresponding output block is a ciphertext block; and
   the first cryptographic engine is an encryption engine configured to:
      receive the expanded cryptographic key and the input block; and
      encrypt the input block using the expanded cryptographic key to output the corresponding output block for transmission to the RAM.

3. The circuit of claim 1, wherein:
   the keystore further comprises a local cache configured to:
      store a plurality of key identifiers and corresponding expanded cryptographic keys; and
      look up the received key identifier;
   if the received key identifier is matched by the local cache, then the local cache is configured to then provide a corresponding expanded cryptographic key to the first cryptographic engine in response to matching the received key identifier;
   if the received key identifier is not matched by the local cache, then the keystore is configured to then update the local cache with the received key identifier and a corresponding expanded cryptographic key generated by the key-expansion engine, wherein the key-expansion engine is configured to provide the corresponding expanded cryptographic key to both the local cache and the first cryptographic engine.

4. The circuit of claim 1, wherein:
   the keystore further comprises a seedstore configured to:
      store a plurality of key seeds indexed by their corresponding key identifiers; and
      provide to the key-expansion engine a corresponding key seed as the first key-expansion input in response to receiving the key identifier.

5. The circuit of claim 1, wherein:
   the keystore comprises a counterstore configured to:
      store a plurality of counter values indexed by their corresponding key identifiers;
      provide a corresponding counter value as the first key-expansion input to the key-expansion engine in response to receiving a key identifier;
   the key-expansion engine is configured to perform the key-expansion operation on the first key-expansion input and a global-seed value to generate the expanded cryptographic key.

6. The circuit of claim 1, wherein:
   the first key-expansion input is the received key identifier;
   the key-expansion engine is configured to perform the key-expansion operation on the first key-expansion input and a global-seed value to generate the expanded cryptographic key.

7. A method for an integrated circuit system comprising a memory cryptography circuit connected to a processor and a random-access memory (RAM), the memory cryptography circuit comprising a keystore, a key-expansion engine, and a first cryptographic engine, the method comprising:
   receiving, by the keystore, a key identifier; and
   providing, by the keystore, to the key-expansion engine a first key-expansion input based on the key identifier;
   performing, by the key-expansion engine, a key-expansion operation on the first key-expansion input to generate an expanded cryptographic key;
   receiving, by the first cryptographic engine, the expanded cryptographic key and an input block;
   processing, by the first cryptographic engine, the input block using the expanded cryptographic key; and
   outputting, by the first cryptographic engine, a corresponding output block, wherein the memory cryptography circuit is configured to perform one of receiving the input block from the RAM and transmitting the output block to the RAM;
   the input block is one of a plaintext block and a cyphertext block;
   if the input block is a plaintext block, then:
      the corresponding output block is a ciphertext block; and
      the first cryptographic engine is an encryption engine configured to:
         receive the expanded cryptographic key and the input block; and
         encrypt the input block using the expanded cryptographic key to output the corresponding output block for transmission to the RAM; and
   if the input block is a cyphertext block, then:
      the cyphertext block is received from the RAM;
      the corresponding output block is a plaintext block; and the first cryptographic engine is a decryption engine configured to;
  receive the expanded cryptographic key and the input block; and
  decrypt the input block using the expanded cryptographic key to output the corresponding output block.

8. The method of claim 7, wherein:
the keystore further comprises a local cache configured to store a plurality of key identifiers and corresponding expanded cryptographic keys; and
the method further comprises:
  looking up the received key identifier in the local cache;
  if the received key identifier is found in the local cache, then providing, by the local cache, a corresponding expanded cryptographic key to the first cryptographic engine in response to matching the received key identifier; and
  if the received key identifier is not found in the local cache, then updating the local cache with the received key identifier and a corresponding expanded cryptographic key generated by the key-expansion engine, wherein the key-expansion engine provides the corresponding expanded cryptographic key to both the local cache and the first cryptographic engine.

9. The method of claim 7, wherein:
the keystore further comprises a seedstore; and
the method further comprises:
  storing, in the seedstore, a plurality of key seeds indexed by their corresponding key identifiers; and
  providing, by the seedstore, to the key-expansion engine a corresponding key seed as the first key-expansion input in response to receiving the key identifier.

10. The method of claim 7, wherein:
the keystore comprises a counterstore; and
the method further comprises:
  storing, in the counterstore, a plurality of counter values indexed by their corresponding key identifiers;
  providing, by the counterstore, a corresponding counter value as the first key-expansion input to the key-expansion engine in response to receiving a key identifier;
  performing, by the key-expansion engine, the key-expansion operation on the first key-expansion input and a global-seed value to generate the expanded cryptographic key.

11. The method of claim 7, wherein:
the first key-expansion input is the received key identifier; and
the method further comprises performing, by the key-expansion engine, the key-expansion operation on the first key-expansion input and a global-seed value to generate the expanded cryptographic key.

12. An integrated circuit (IC) system comprising a first processor, a first random-access memory (RAM), and a memory cryptography circuit, wherein:
  the memory cryptography circuit is connected to the first processor and the first RAM;
  the memory cryptography circuit comprises a keystore;
  the keystore comprises a key-expansion engine;
  the keystore is configured to:
    receive a key identifier; and
    provide to the key-expansion engine a first key-expansion input based on the key identifier;
  the key-expansion engine is configured to perform a key-expansion operation on the first key-expansion input to generate an expanded cryptographic key;
  the memory cryptography circuit comprises a first cryptographic engine configured to receive the expanded cryptographic key and an input block;
  the first cryptographic engine is configured to process the input block using the expanded cryptographic key to output a corresponding output block; and
  the memory cryptography circuit is configured to perform one of receiving the input block from the RAM and transmitting the output block to the RAM;
  the input block is one of a plaintext block and a cyphertext block;
  if the input block is a plaintext block, then:
    the corresponding output block is a ciphertext block; and
    the first cryptographic engine is an encryption engine configured to:
      receive the expanded cryptographic key and the input block; and
      encrypt the input block using the expanded cryptographic key to output the corresponding output block for transmission to the RAM; and
  if the input block is a cyphertext block, then:
    the cyphertext block is received from the RAM;
    the corresponding output block is a plaintext block; and
    the first cryptographic engine is a decryption engine configured to;
      receive the expanded cryptographic key and the input block; and
      decrypt the input block using the expanded cryptographic key to output the corresponding output block.

13. The circuit of claim 1, wherein each of the plurality of key identifiers and corresponding expanded cryptographic keys corresponds to a distinct protected software environment comprising at least one of a virtual machine, driver, application, sub-process, and thread.

14. The circuit of claim 1, wherein the local cache comprises static random-access memory (SRAM).

15. The IC system of claim 12, further comprising a data cache configured to provide to the memory cryptography circuit a data packet comprising the received key identifier, a memory address, and a data payload.

* * * * *